(12) United States Patent
Buczynski (10) Patent No.: US 11,400,871 B2
(45) Date of Patent: Aug. 2, 2022

(54) METAL RETENTION CLIP

(71) Applicant: ILLINOIS TOOL WORKS INC., Glenview, IL (US)

(72) Inventor: Gregory George Buczynski, Ferndale, MI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/150,665

(22) Filed: Jan. 15, 2021

(65) Prior Publication Data
US 2021/0221305 A1    Jul. 22, 2021

Related U.S. Application Data

(63) Continuation of application No. 29/721,330, filed on Jan. 20, 2020, now Pat. No. Des. 934,063.

(60) Provisional application No. 62/962,497, filed on Jan. 17, 2020.

(51) Int. Cl.
*B60R 13/02* (2006.01)
*F16B 21/07* (2006.01)
*F16B 5/06* (2006.01)

(52) U.S. Cl.
CPC .......... *B60R 13/0206* (2013.01); *F16B 5/065* (2013.01); *F16B 21/075* (2013.01)

(58) Field of Classification Search
CPC .... B60R 13/0206; F16B 5/065; F16B 21/075; F16B 21/086; F16B 2/243; F16B 2/245
See application file for complete search history.

(56) References Cited

U.S. PATENT DOCUMENTS

| | | |
|---|---|---|
| 6,074,150 A | 6/2000 | Shinozaki et al. |
| 6,317,937 B1 | 11/2001 | Ishihara et al. |
| 6,796,006 B2 | 9/2004 | Hansen |
| 7,120,971 B2 | 10/2006 | Osterland et al. |

(Continued)

FOREIGN PATENT DOCUMENTS

| | | |
|---|---|---|
| EP | 1482184 A2 | 12/2004 |
| FR | 20120391001 | 1/2012 |

(Continued)

OTHER PUBLICATIONS

International Search Report and Written Opinion of the International Searching Authority from corresponding PCT Application No. PCT/US2021/013711, dated May 7, 2021 (14 pages).

*Primary Examiner* — Robert Sandy
*Assistant Examiner* — Rowland Do
(74) *Attorney, Agent, or Firm* — Quarles & Brady LLP (57) ABSTRACT

A retention clip is configured to securely connect a first component to a second component. The retention clip includes a first frame connected to an opposed second frame by a central beam. An interior of the clip is defined between the first and second frames. Each of the first and second frames includes lateral legs that fold inwardly at upper bends, thereby forming flanges that are disposed within the interior. The flanges on respective sides of the clip are integrally connected by a bridging member, and the flanges further include distal ends that extend below a bottom edge of the bridging member. The clip further includes a flexible wing for securing the clip within the interior of a panel opening. Some embodiments of a retention clip include protrusions that extend inwardly from the bridging members.

16 Claims, 5 Drawing Sheets

(56) References Cited

U.S. PATENT DOCUMENTS

| | | |
|---|---|---|
| D572,129 S | 7/2008 | Keays |
| 7,640,634 B2 | 1/2010 | Vassiliou |
| D619,711 S | 7/2010 | Lombardo et al. |
| 8,370,999 B2 * | 2/2013 | Camus ................ F16B 19/1081 |
| | | 24/295 |
| D691,026 S | 10/2013 | Komeno et al. |
| D693,733 S | 11/2013 | Fujii |
| D708,044 S | 7/2014 | Komeno et al. |
| D709,354 S | 7/2014 | Komeno et al. |
| D722,491 S | 2/2015 | Ramsauer |
| D722,493 S | 2/2015 | Ramsauer |
| 9,080,588 B2 | 7/2015 | Diez Herrera et al. |
| D759,475 S | 6/2016 | Banno |
| D759,476 S | 6/2016 | Iwahara et al. |
| D763,066 S | 8/2016 | Sugimoto |
| D798,136 S | 9/2017 | Pittman |
| D811,869 S | 3/2018 | Gallion et al. |
| D816,474 S | 5/2018 | Ochi et al. |
| 10,704,577 B2 | 7/2020 | Benedetti |
| 11,261,898 B2 * | 3/2022 | Ammann ................ F16B 2/22 |
| 2003/0079316 A1 | 5/2003 | Ogawa |
| 2003/0200634 A1 | 10/2003 | Hansen |
| 2005/0000063 A1 * | 1/2005 | De Azevedo ......... F16B 5/0635 |
| | | 24/295 |
| 2005/0155191 A1 | 7/2005 | Asano et al. |
| 2007/0186389 A1 | 8/2007 | Smith et al. |
| 2007/0216139 A1 | 9/2007 | Mazanek et al. |
| 2011/0209309 A1 | 9/2011 | Camus |
| 2011/0314642 A1 * | 12/2011 | Diez Herrera ........ F16B 21/075 |
| | | 24/293 |
| 2015/0026933 A1 | 1/2015 | Komeno et al. |
| 2015/0232011 A1 * | 8/2015 | Kajio .................... B60N 3/026 |
| | | 296/1.02 |
| 2016/0356298 A1 * | 12/2016 | Pquet ..................... E05C 19/06 |
| 2016/0375840 A1 * | 12/2016 | Dickinson ............... B60R 13/02 |
| | | 24/295 |
| 2019/0014676 A1 * | 1/2019 | Nakamura ............. F16B 2/245 |

FOREIGN PATENT DOCUMENTS

| | | |
|---|---|---|
| WO | 2010104674 A1 | 9/2010 |
| WO | 2011103068 A2 | 8/2011 |

\* cited by examiner

METAL RETENTION CLIP

CROSS REFERENCE TO RELATED APPLICATIONS

This application relates to and claims the priority benefit of U.S. Provisional Patent Application No. 62/962,497, entitled "Metal Retention Clip," filed on Jan. 17, 2020, and is a continuation-in-part of U.S. Design patent application Ser. No. 29/721,330, entitled "Fastening Clip," filed on Jan. 20, 2020, both of which are hereby incorporated by reference in their entireties.

FIELD OF EMBODIMENTS OF THE DISCLOSURE

Embodiments disclosed herein generally relate to fasteners, and, more particularly, to retention clips that are configured to connect or couple multiple components to one another.

BACKGROUND

Various components are secured together through retention clips. For example, panels, sheets, frames, and the like may be secured together through fastener assemblies that include a male fastening member that securely mates with a female fastening member. As another example, a retention clip may be used to secure two or more components together. In the motor vehicle industry, clips may be used to securely couple self-supporting parts to vehicle panels.

A clip may be used to secure a first component (such as a rib member) to a second component (such as a panel). A clip may define an interior to receive and retain a rib member, and a fastening member may be urged into a slot of a panel, for example.

U.S. Pat. No. 6,796,006, entitled "Rib Clip" discloses a rib clip. U.S. Pat. No. 7,640,634, entitled "Ergonomic Fastener" discloses a clip fastener. U.S. Pat. No. 6,796,006, entitled "Rib Clip" discloses a rib clip. U.S. Pat. No. 7,640,634, entitled "Ergonomic Fastener" discloses a clip fastener. U.S. Patent Application Publication No. 2015/0026933, entitled "Clips," discloses a clip having a main clip body that is configured to be inserted into an installing hole of a panel and mounted to a clip seat. U.S. Pat. No. 6,796,006, entitled "Rib Clip," discloses a retaining clip including a U-shaped body having a pair of legs that are flexibly connected at their bottom ends and spaced apart to receive therebetween a blade fastener. U.S. Pat. No. 9,080,588, entitled "Quick Fastening Clip", discloses a clip having a main body including flexible legs that, when folded, provide a means for coupling with a retaining stud, and flexible wings spring outwardly from the clip body to retain the clip within an opening in a panel.

The prior art fasteners described above highlight the general principles of fasteners presently known, which include a fastening member, i.e. a clip, that is configured to receive and couple with a first component, such as a rib member. These prior art fasteners are further configured to be introduced through a slot in a second component, such as a panel, and include means for engagement with the second component.

Certain known clips, such as those disclosed within U.S. Pat. No. 10,704,577, include outwardly extending flanges that seat upon the outer surface of a panel when the clip is inserted through an opening in the panel. However, such clips are ill-suited for use with panels that have irregular outer surfaces or thickness dimensions that vary in the area of coupling. In these instances, the flanges are unable to sit flush against the outer surface of the panel.

The popularity of plastic retention clips has also increased, with many new assemblies, including automobiles, implementing less expensive plastic versions of metal clips. However, known plastic clips also have disadvantages. When used on a rib, the plastic fastener requires a depression or hole to be molded or punched into the plastic rib on which the clip is mounted, which requires an added manufacturing step. Further, the hole receives projections from the spring-like legs of the clip to retain the clip on the plastic rib, which adds to the complexity of manufacturing same.

SUMMARY OF EMBODIMENTS OF THE DISCLOSURE

A need exists for a retention clip that securely and efficiently connects to one or more components. Further, a need exists for a clip that is able to resist extraction without undesirably affecting a component, and for a clip that is simple to manufacture and assemble.

With respect to these and other considerations, certain embodiments of the present disclosure provide a retention clip that is configured to securely couple a first component, such as a rib member, to a second component, such as a panel. The retention clip may comprise a generally U-shaped body including opposed first and second frames extending from a central flange. The opposed first and second frames include lateral legs that, when folded, include a means for retaining an inserted first component as well as flexible exterior flanges for retaining the clip within the interior of an opening in the second component.

In some embodiments, a retention clip is configured to securely couple to a first component to form a sub-assembly, and the sub-assembly is configured to be securely coupled to a second component to form an assembly.

In some embodiments, a retention clip comprises a generally U-shaped body including a first frame connected to an opposed second frame at a central beam. The clip includes an interior that is defined between the opposed first and second frames. The first and second frames include lateral legs that fold inwardly at upper bends to form flanges that are disposed within the interior, and the flanges are generally directed toward the central beam. The flanges of the first frame are integrally connected by a first bridging member, and the flanges of the second frame are integrally connected by a second bridging member. In some embodiments, each of the first and second bridging members includes a bottom edge, and the distal ends of the flanges extend below the bottom edges of the bridging members. In some embodiments, the bridging members may also include protrusions that extend inwardly from their bottom edges.

In some embodiments, a generally U-shaped retention clip includes flanges that are integrally connected by bridging members, wherein the bridging members include protrusions that extend inwardly toward a central longitudinal plane of the clip. In some embodiments, the protrusions may be disposed centrally between the flanges. In some embodiments, the protrusions comprise a serriform structure that includes ramped surfaces that periodically extend toward the central longitudinal plane of the clip. In some embodiments, protrusions on a first frame of the clip structurally mirror the protrusions on an opposing second frame.

In some embodiments, a clip includes a generally U-shaped body comprising opposed first and second frames connected by a central beam. The first and second frames each include flexible wings that extend outwardly and upwardly from the central beam. When the clip is urged through an opening in a panel, a portion of the flexible wing is configured to securely abut into an interior surface of the panel. In some embodiments, the wings include a contact tab that extends inwardly from an upper shoulder of the clip. The contact tab includes a contact surface that is configured to securely abut against a surface within the interior of an opening or hole in the second component.

Some embodiments of the present disclosure provide an assembly that includes a first component, a second component defining an opening, a retaining clip that securely couples to the first component to form a sub-assembly, and an assembly wherein the sub-assembly is securely coupled to the second component. In some embodiments, the second component may have a variable thickness in the area of the opening.

In some embodiments, the retaining clip includes a first frame connected to an opposed second frame by a central flange. In some embodiments, the opposed first and second frames include folded lateral legs with means for retaining the first component and flexible exterior wings configured for coupling with the second component.

Before the embodiments of the present disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a retention clip that is configured to securely join first and second components together to define a retention clip assembly. The retention clip may be formed of metal. One of the first or second components may include a panel or rib structure that may be formed of a thermoplastic material. The other of the first or second components may include a rectangular opening and may be formed of thermoplastic material. Such a component allows for a relatively low insertion effort for ergonomics and effectively resists undesired extraction. In alternative embodiments, one or both of the first and second components may be formed from a metallic material or a combination of known materials.

The retention clip may be formed from a uniform strip of metal (such as steel) through trimming, bending, and forming processes. It has been found the retention clip disclosed herein maintains connection with the component(s) during extraction, is useable over multiple installations and extractions, and maintains structural integrity during uneven loading and angled extractions. In alternative embodiments, the retention clip may be formed from other materials, e.g. thermoplastic materials, composite materials, or combinations of materials. However, it has been observed that the clip is better able to form a secure connection when it is formed from a material that is harder than the material(s) comprising the first and second components.

In order to secure the retention clip to the components, the retention clip may first be secured to a rib member, i.e., a first component, to form a sub-assembly. In practice, such a process may be performed by a supplier of an original equipment manufacturer. The process may be repeated multiple times per component to prepare multiple fastening points. Next, the sub-assembly that includes the retention clip and the rib member is positioned relative to another component, i.e., the second component, which may include at least one opening, e.g., one or more rectangular openings. The sub-assembly is then urged towards the second component in an axial direction such that the opening engages with the clip and the rib structure.

Figure 1:
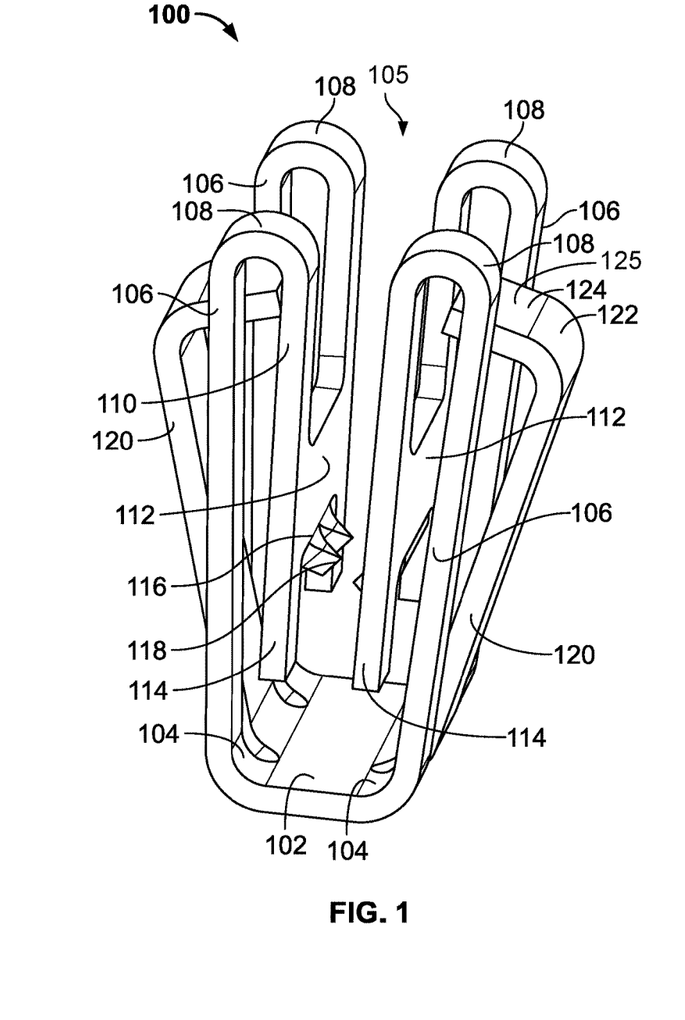
FIG. 1 illustrates a top, front, and left isometric view of a retention clip, according to an embodiment of the present disclosure.
Figure 2:
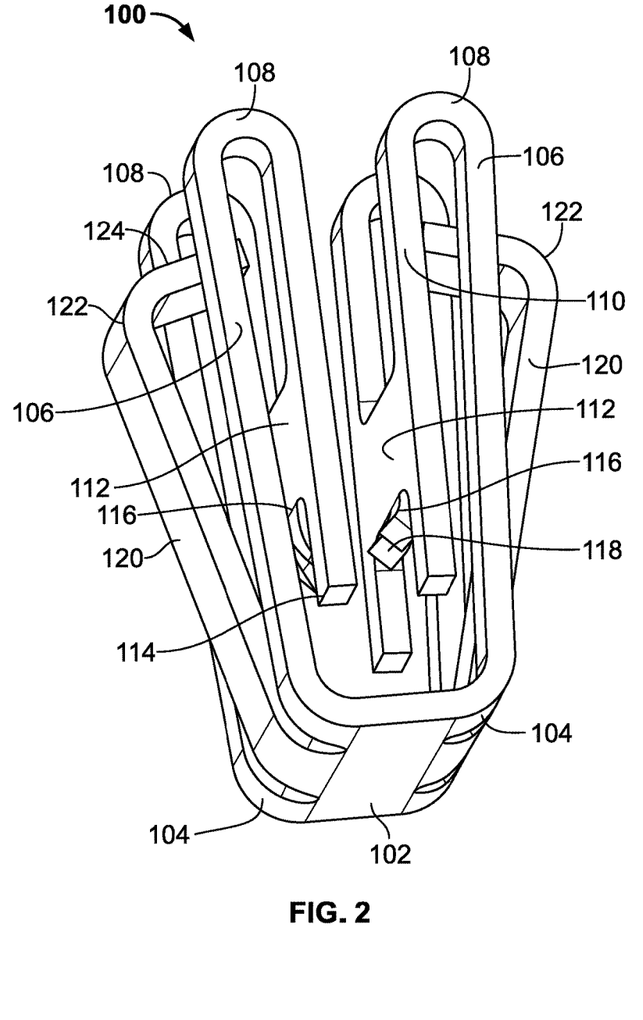
FIG. 2 illustrates a bottom, front, and right isometric view of the retention clip of FIG. 1.

Referring now to FIGS. 1 and 2, isometric front views of a retention clip 100 are illustrated according to an embodiment of the present disclosure. The retention clip 100 generally includes a U-shaped main body comprising opposing frames 104 connected together by a central beam or body 102. The central body 102 is generally rectangular and connects the opposing frames 104 at curved lower shoulders thereof. An opening to an interior 105 of the retention clip 100 is defined between the opposed frames 104, and the retention clip 100 is configured to receive a first component 200 into the interior 105 to form a sub-assembly with the first component 200. Unless otherwise specified herein, the retention clip 100 is a unitary component, and all elements of the retention clip 100 are integrally connected to one another.

Still referring to FIGS. 1 and 2, lateral legs 106 extend upwardly from the curved lower shoulders of the opposed frames 104. Each leg 106 integrally connects to an upper bend 108, which, formed by means of a fold, curves inwardly toward a central longitudinal plane 150 of the retention clip 100 (see FIG. 3). The bends 108 integrally connect to interior flanges 110 that are slightly angled with respect to the lateral legs 106 and extend within the interior 105 in the direction of the central body 102. The interior flanges 110 of the respective frames 104 are integrally joined by bridging members 112. In some embodiments, the interior flanges 110 are also substantially parallel with respect to one another.

Still referring to FIGS. 1 and 2, distal ends 114 of the interior flanges 110 extend beyond the bridging members 112 in the direction of the central body 102. The interior flanges 110, bridging members 112, and distal ends 114 together form bearing surfaces, which are configured to abut an outer surface of the first component 200 (see FIGS. 7 and 8) following assembly therewith. Notably, the constructional form of the parts described herein are intended to facilitate the introduction of the first component 200 inside of the retention clip 100, while minimizing the zones of mutual contact which cause engagement thereof.

Figure 3:
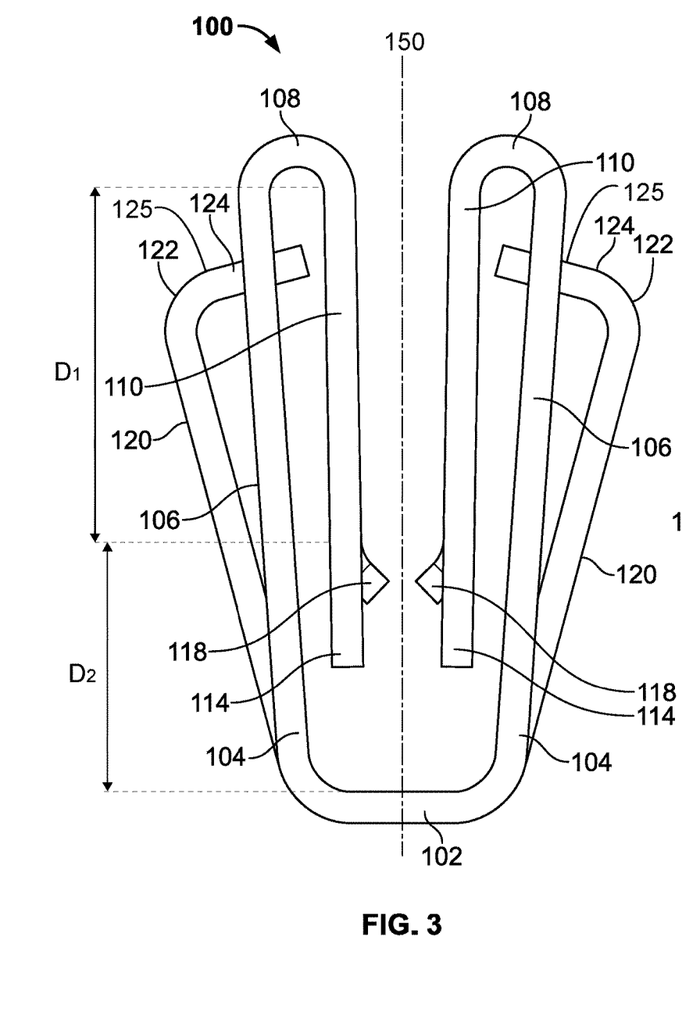
FIG. 3 illustrates a front elevational view of the retention clip of FIG. 1.
Figure 4:
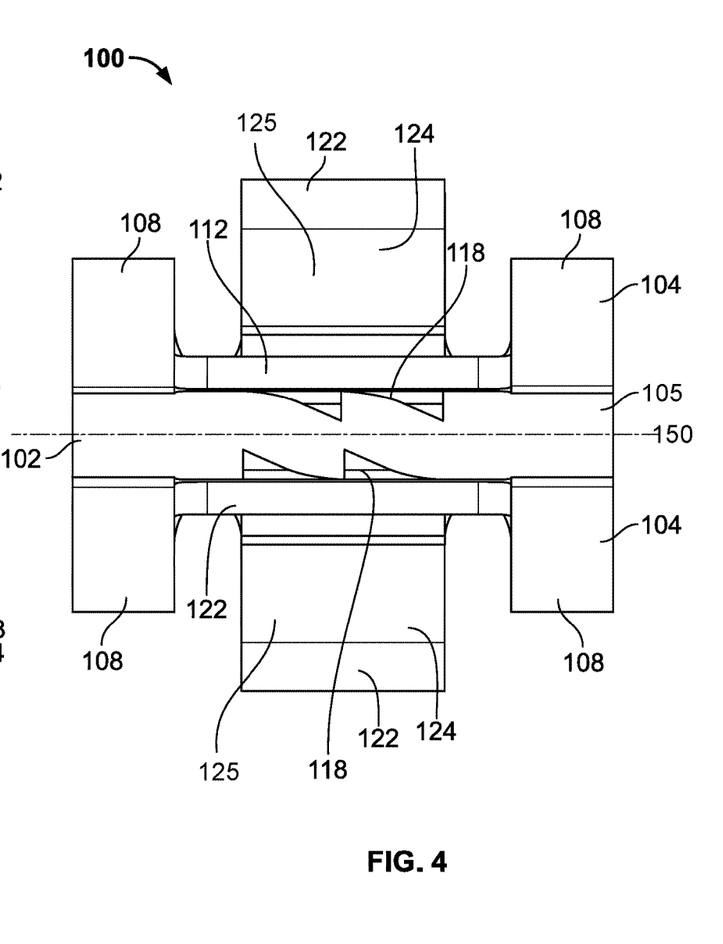
FIG. 4 illustrates a top plan view of the retention clip of FIG. 1.
Figure 5:
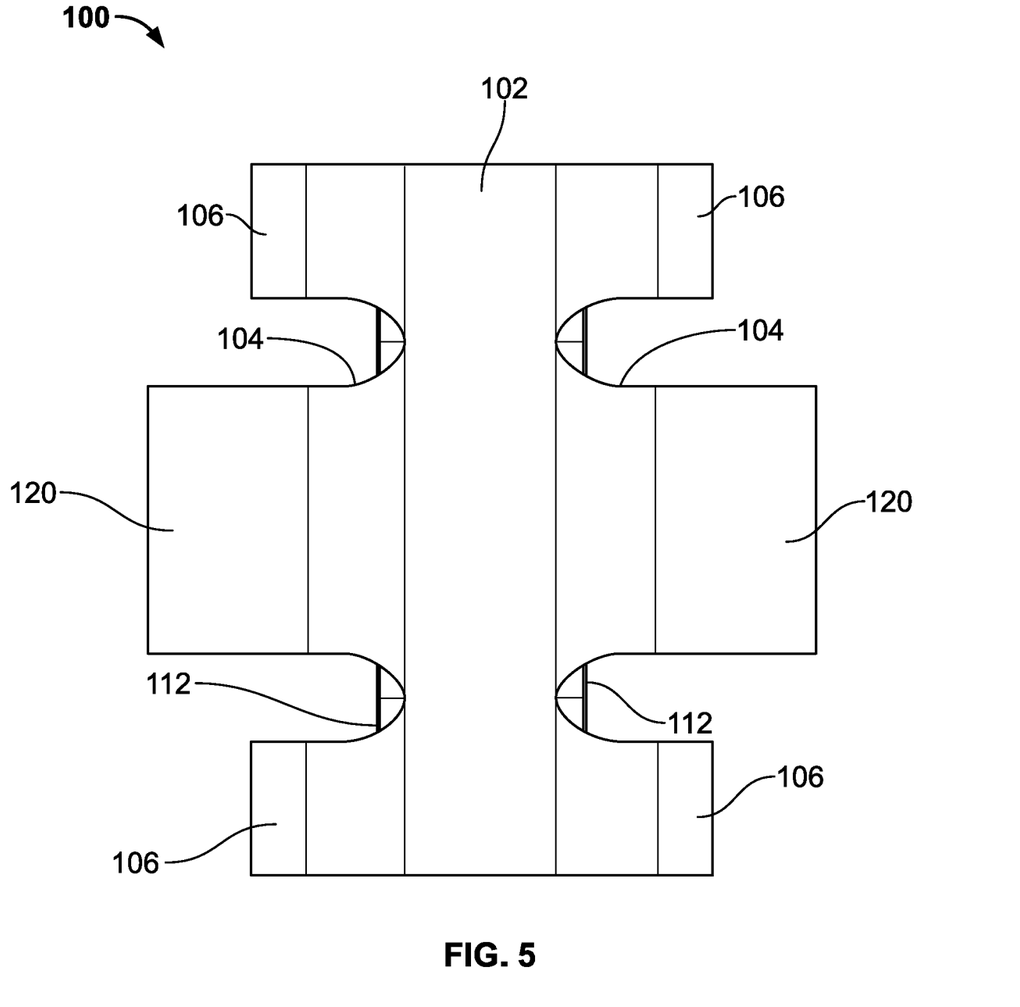
FIG. 5 illustrates a bottom plan view of the retention clip of FIG. 1.

With specific reference to FIG. 2, each of the bridging members 112 includes a bottom edge 116, and one or more protrusions 118 extend towards the interior 105 of the retention clip 100 from the bottom edge 116. The protrusions 118 are illustrated to extend curvilinearly downward and inward from the bottom edge 116 toward the central longitudinal plane 150 of the retention clip 100, as is best shown in FIGS. 3 and 4. The opposing protrusions 118 are configured to bite or clamp onto the first component 200 and provide a primary means for retaining the first component 200 in connection with the retention clip 100.

In the illustrated embodiment, the opposing protrusions 118 comprise mirrored serriform structures (i.e. "sawtooth-like" structures). That is, the opposing protrusions 118 structurally mirror one another and include ramped surfaces that periodically extend in the general direction of the central longitudinal plane 150. The opposed, mirrored protrusions 118 are configured to maintain contact with the first component 200 to prevent rattling and maintain a secure, axially aligned connection with the first component 200. The sawtooth structure of the protrusions 118 is best shown in FIG. 4. Compared to barb fasteners of the prior art, the protrusions 118 described herein demonstrate better retentive abilities and an improved resistance to deformation.

Functionally, the upper bends 108 of the retention clip 100 cause the interior flanges 110 to behave like torsional springs. As such, the magnitude of the compressive force that is applied to the first component 200 by way of the mirrored protrusions 118 is, in part, a function of the distance between the protrusions 118 and the upper bends 108. Such a configuration provides a clip manufacturer with the ability to create clips that are optimized (in terms of their retention strength) to suit the particular needs of a given application by manipulation of the distance between upper bends 108 and the protrusions 118.

As illustrated in FIG. 3, the protrusions 118 are spaced apart from the upper bends by a first vertical distance $D_1$, and the protrusions 118 are spaced apart from the central body 102 by a second vertical distance $D_2$ that is less than the first distance $D_1$. However, it is to be understood that alternative embodiments of retention clips 100 of the present invention may include alternative configurations wherein distances between the protrusions 118, the central body 102, and the upper bends 108 are different than as shown.

With reference to FIGS. 1-4, retention clips 100 of the present disclosure also include means for securely coupling to a second component 202. Specifically, the retention clip 100 includes flexible exterior flanges or wings 120 that are disposed between the lateral legs 106, splay outward from the lower shoulders of the opposed frames 104, and extend upward from the central body 102. The flexible wings 120 include upper shoulders 122 comprising bends directed inwardly toward the central longitudinal plane 150. The shoulders 122 are integrally connected to contact tabs 124 that include an exterior surface 125 for contacting a portion of a panel opening 210 within an interior 216 of the panel (see FIGS. 7 and 8).

Figure 6:
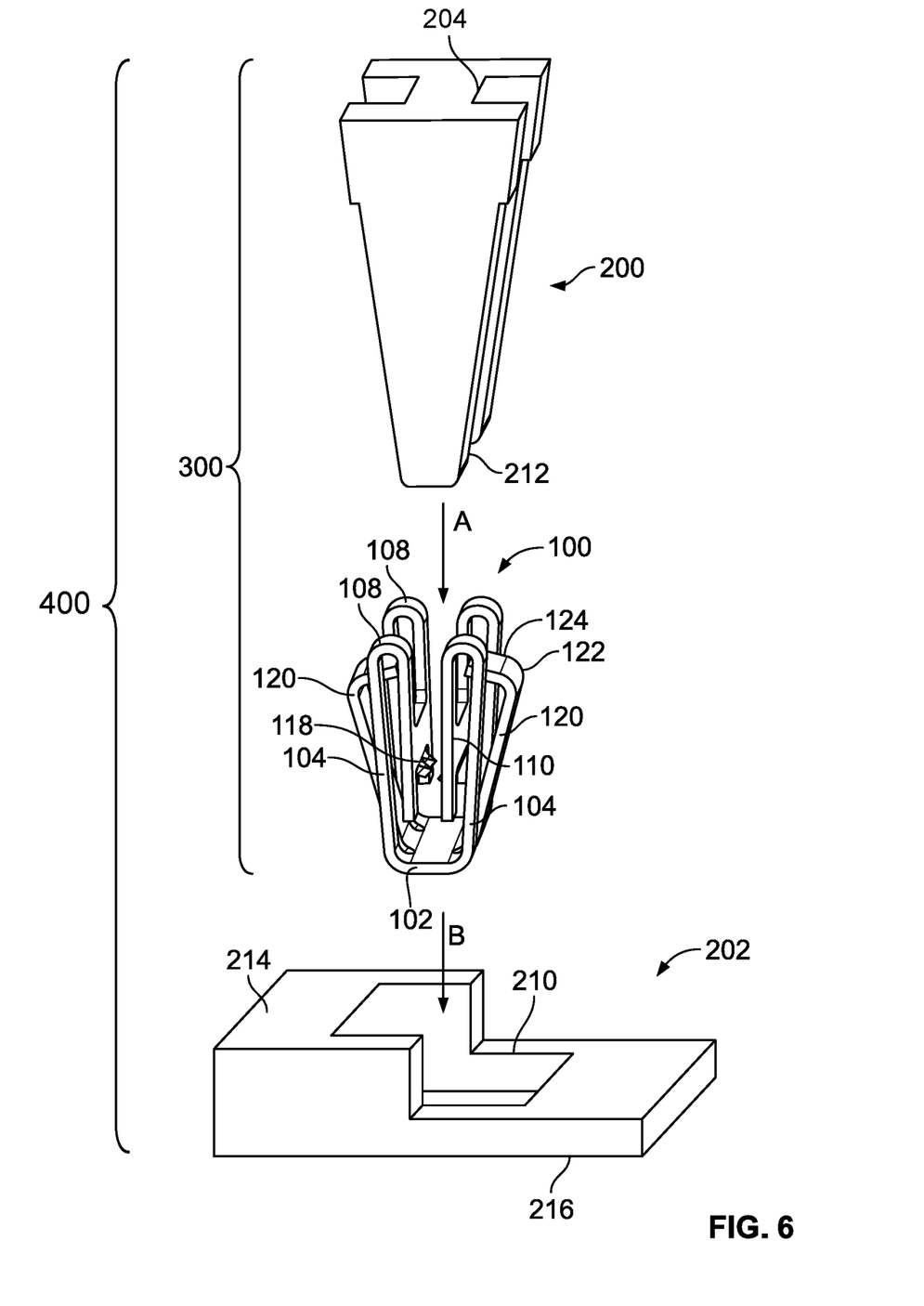
FIG. 6 illustrates an exploded perspective view of a retention clip assembly that includes the retention clip of FIG. 1 shown separated from a first component and a second component, with the second component defining a panel with a non-constant thickness.
Figure 7:
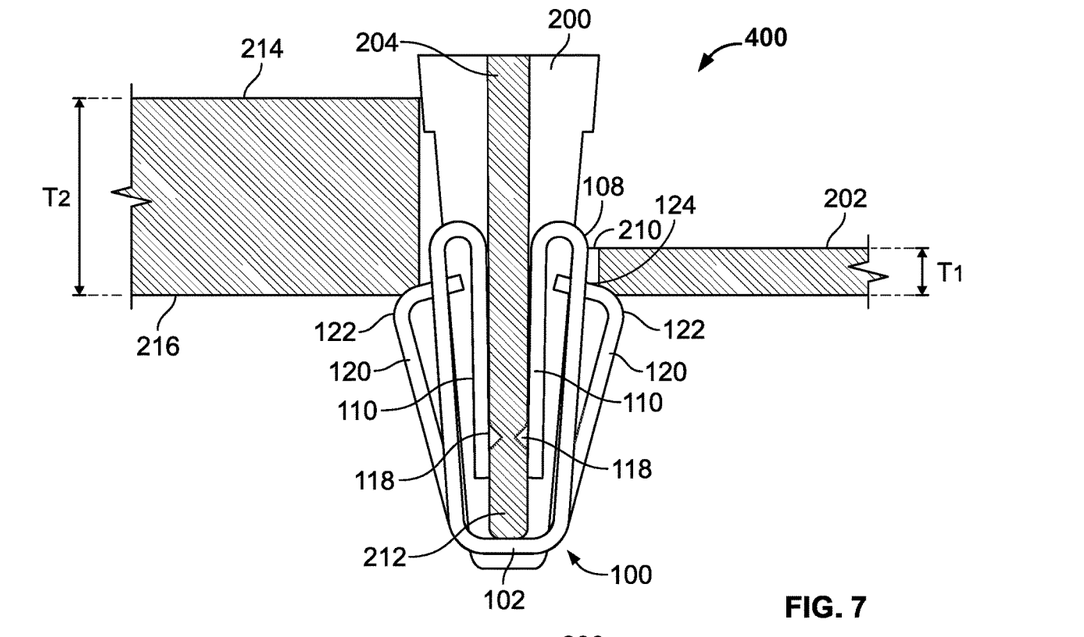
FIG. 7 illustrates a front, partial cross-sectional view of the retention clip assembly of FIG. 6 shown in an assembled configuration.
Figure 8:
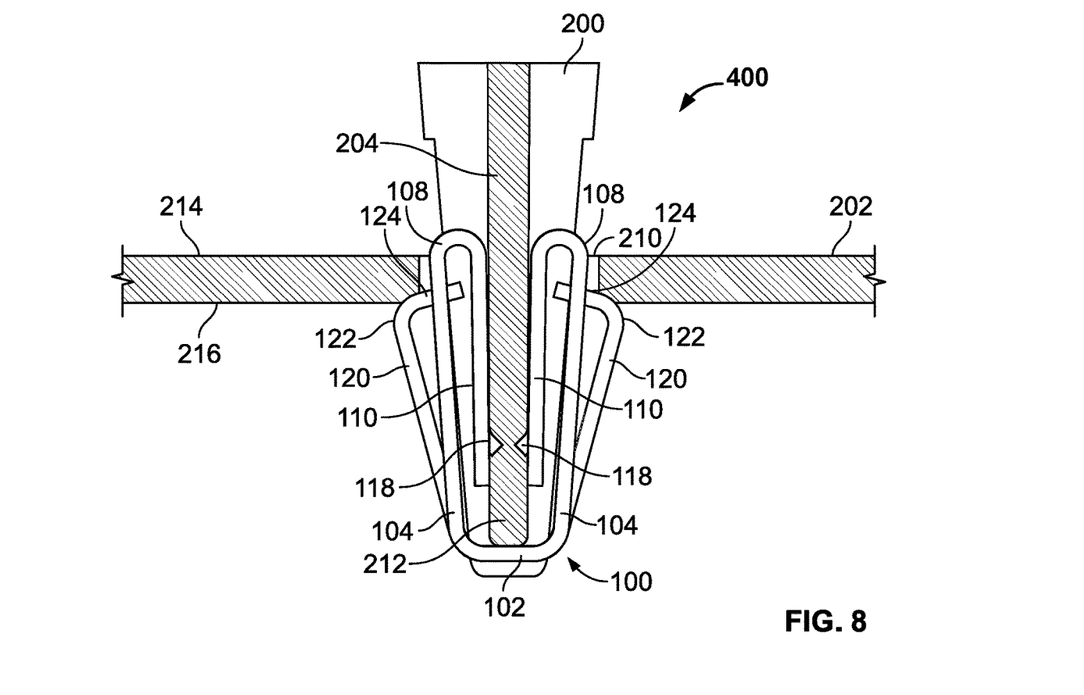
FIG. 8 illustrates a front, partial cross-sectional view of another retention clip assembly that includes the retention clip of FIG. 1 shown coupled with a first component and a second component, with the second component defining a panel with a constant thickness.

Referring now to FIGS. 6-8, the retention clip 100 is configured to initially couple with the first component 200 to form the sub-assembly 300. FIG. 6 illustrates a perspective front view of the retention clip 100 separated from the first component 200 and the second component 202, according to an embodiment of the present disclosure. The first component 200 may be a rib panel including a planar main body 204 that terminates at a lower end 212. The retention clip 100 incorporates the ability to locate the lower end 212 of the first component 200 against the central body 102 of the clip without requiring an additional feature (on the first component 200) to act as a retention assist or locator, e.g., an aperture or other feature.

The assembly process includes an initial pre-assembly to securely couple the retention clip 100 and the first component 200. Pre-assembly comprises slidably passing the first component 200 into the interior 105 of the clip 100 such that the first component 200 is vertically aligned with the central longitudinal plane 150 of the clip 100 and the lower end or tip 212 of the first component 200 is directed generally toward the central body 102. The interior flanges 110 of the clip 100 ensure guided, gradual entry of the first component 200, the tip 212 of which splays the interior flanges 110 to facilitate insertion until the tip 212 reaches the protrusions 118. Continued sliding movement of the first component 200 beyond the protrusions 118 will further splay the interior flanges 110, until the tip 212 of the first component 200 seats against an upper surface of the central body 102. When the first component 200 is fully inserted, the protrusions 118 grip upon exterior surfaces of the planar main body 204 of the first component 200.

During insertion of the first component 200, an outward flaring of the interior flanges 110 results from an urging provided by the tip 212, thus making the projections 118 less susceptible to digging, cutting, or otherwise marring the first component 200. The opposed, mirror image projections 118 are configured to maintain contact with the first component 200 to prevent rattling and maintain a secure, axially aligned connection with the first component 200. As indicated, the protrusions 118 are mirror images of one another and are located on opposite sides of the central longitudinal plane 150. The protrusions 118 are configured to provide a desired interference with the first component 200, limit rattling, and maintain ergonomic installation effort.

With reference to FIGS. 1-4, the clip 100 further includes a means for securing within the interior of the opening 210 of the second component 202. In the illustrated embodiments, a retention clip 100 includes flexible wings 120 that bow upwardly and outwardly from the central body 102. The flexible wings 120 do not extend to a height beyond that of the upper bends 108. The flexible wings 120 include contact tabs 124 that are directed inwardly from upper shoulders 122. The opposing projections 118 may bite into the surface of the first component 200 (on opposite sides) without abutting one another, and the contact tabs 124 are positioned such that they do not interfere with the first component during assembly with the retention clip 100.

FIG. 6 illustrates a perspective view of the retention clip 100 separated from the first component 200 and the second component 202, according to an embodiment of the present disclosure. The retention clip 100 securely couples to the first component 200 and the second component 202 to form an assembly 400. As described above, the retention clip 100 includes the first frame 104 connected to the opposed second frame 104 by the central body 102. The first component 200 may be the rib member with the planar main body 204, and the second component 202 may comprise the panel with the rectangular opening 210 formed therethrough. In FIGS. 6 and 7, the illustrated second component 202 comprises a panel having two distinct thicknesses (T1 and T2) in area of the opening 210. In FIG. 8, the second component 202 comprises a panel having a uniform thickness.

As shown in FIG. 6, the first component 200 is vertically oriented, while the second component 202 is horizontally oriented. Optionally, the orientations of the first and second components 202 and 202 may be different than shown. The retention clip 100 is configured to orthogonally and securely couple the first component 200 to the second component 202. In order to secure the first and second components 202 and 202 together, the first component 200 is urged onto the retention clip 100 in the direction of arrow A. Optionally, the retention clip 100 may be urged towards the first component 200 in a direction that is opposite to arrow A.

Retention clips 100 in accordance with the present disclosure do not include attachment features configured to abut against any exterior surfaces 214 of the second component 202. Instead, the attachment between the retention clip 100 and the second component 202 occurs by means of the flexible wings 120 that spring outwardly from the clip 100 when the clip is passed through the opening 210. The flexible wings 120 include contact tabs 124 that bend inwardly from outer shoulders 122 to abut against the interior surface 216 of the second component 202 proximate the opening 210. As such, retention clips 100 of the present invention are suitable for use with any variation of second components 202 so long as they include the generally flat interior surface 216 in the area of the opening 210.

FIG. 7 illustrates a front view of the retention clip 100 that has been secured to the first component 200 to form the sub-assembly 300. Further, the sub-assembly 300 has been subsequently inserted through the opening 210 of the second component 202 to complete the full assembly 400. In the embodiment shown in FIG. 7, the second component 202 may include an irregular outer surface and includes two panel thicknesses $T_1$, $T_2$ in the area of the hole 210. As discussed above, retention clips 100 of the present disclosure are suitable for coupling a first component 200 to a panel that does not have a uniform thickness. However, clips of the present disclosure still possess the ability to couple with conventional panels of a single thickness, and FIG. 8 illustrates the retention clip assembly 400 including a panel having a single, uniform thickness.

In order to secure the retention clip 100 (or sub-assembly 300) to the second component 202, the central body 102 of the clip 100 is aligned with the opening 210 of the second component 202. The clip 100 (or sub-assembly 300) is then urged into the opening 210 in the direction of arrow B. Optionally, the second component 202 may be urged toward the sub-assembly 300 in an opposite direction. As the retention clip 100 is urged through the opening 210 of the second component 202, the flexible wings 120 (shown in FIGS. 1-5) compress inwardly toward the central longitudinal plane 150. Following complete insertion of the retention clip 100 through the opening 210, the flexible wings 120 spring open outwardly so that they extend laterally beyond the peripheral edges of the opening 210, thereby securing the retaining clip 100 within the opening 210.

The flexible wings 120 include contact tabs 124 having surfaces 125 or portions that are configured to abut against and compressively engage the interior surface 216 or edge of the second component 202, which is accessed when the clip is passed through the opening 210. The contact tabs 124 are angled such that attempted extraction of the retention clip 100 exerts a compressive force into the tab 124, which splays the flexible wings 120 laterally away from one another, resulting in a secure interference fit between the sub-assembly 300 and the second component 202.

The angle of each wing 120 relative to the central longitudinal plane 150 of the retention clip 100 may be less than 45 degrees. In at least one embodiment, the wings 120 may be oriented relative to the central longitudinal plane 150 at an angle between 20 and 30 degrees. In this manner, the wings 120 are oriented at a relatively shallow angle in relation to the central longitudinal plane 150, which allows for ergonomically efficient insertion, while providing a secure retaining force. Optionally, the angle may be less than twenty degrees or greater than thirty degrees.

The structure of the opposed projections 118 ensures that the projections 118 do not snag the first component 200 as the retention clip 100 is coupled thereto. Further, the distal ends 114 increase an axial alignment tolerance so that the first component 200 may be guided into a secure coupling with the retention clip 100 without the need for a specific and particular insertion angle between the retention clip 100 and the first component 200. As such, the installation process is relatively quick and easy.

The retention clip 100 provides improved retention and serviceability as compared to various known clip fasteners. The retention clip 100 is able to locate the end of a first component 200, during assembly therewith, without the need for additional locating or securing structures to be manufactured on the first component 200. The retention clip 100 provides a fastening system that is capable of securing to panels having multiple thicknesses or irregular exterior surfaces. The retention clip 100 is able to withstand multiple installations and extractions without excessive deformation of the retention clip 100 and the assembly. The retention clip 100 exhibits improved performance as compared to various known clip fasteners. The retention clip 100 limits deformation of the rectangular opening 210 of the second component 202 during installation and extraction. Further, the retention clip 100 maintains structural integrity during angled loading and extraction, in contrast to certain known clip fasteners that are susceptible to dislodging from a structure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35

U.S.C. § 112(f), unless and until such claim limitations expressly use the phrase "means for" followed by a statement of function void of further structure.

Various features of the disclosure are set forth in the following claims.

The invention claimed is:

1. A retention clip configured to securely connect a first component to a second component, the retention clip comprising:
a first frame connected to an opposed second frame at a central beam, wherein an interior of the retention clip is defined between the opposed first and second frames, each of the first and second frames including:
lateral outer legs that fold inwardly at upper bends to form inner flanges that are disposed within the interior and are generally directed toward the central beam, wherein the inner flanges are integrally connected by a bridging member, and wherein lower distal ends of the inner flanges extend below a bottom edge of the bridging member; and
a flexible wing extending upwardly and outwardly from the central beam, wherein a portion of the flexible wing is configured to securely abut onto a surface, and
wherein each of the first and second frames further includes a protrusion that extends downwardly from the bottom edge of the bridging member, and
wherein each protrusion comprises a serriform structure having a ramped surface that extends in the direction of a central longitudinal plane of the clip.

2. The retention clip of claim 1, wherein the retention clip is configured to securely couple to the first component to form a sub-assembly, and wherein the sub-assembly is configured to be securely coupled to the second component to form an assembly.

3. The retention clip of claim 1, wherein the protrusions are configured to securely abut against the first component to secure the first component within the interior.

4. The retention clip of claim 3, wherein the protrusions are spaced apart from the upper bends by a first vertical distance, and the protrusions are spaced apart from the central beam by a second vertical distance that is less than the first vertical distance.

5. The retention clip of claim 3, wherein the flexible wing further includes an upper shoulder, and a contact tab extends inwardly from the upper shoulder in the direction of the central longitudinal plane.

6. A retention clip configured to securely connect a first component to a second component, the retention clip comprising:
a first frame connected to an opposed second frame at a central beam, wherein an interior of the retention clip is defined between the opposed first and second frames, each of the first and second frames including:
outer lateral legs that fold inwardly at upper bends to form interior flanges that are disposed within the interior and extend in the general direction of the central beam, wherein the interior flanges are integrally connected by a bridging member, and wherein protrusions extend downwardly from a bottom edge of the bridging member; and
a flexible wing extending upwardly and outwardly from the central beam, wherein a portion of the flexible wing is configured to securely abut onto a surface, and wherein the protrusions comprise serriform structures having ramped surfaces that extend inwardly in the direction of a central longitudinal plane of the clip.

7. The retention clip of claim 6, wherein the fastening clip is configured to securely couple to the first component to form a sub-assembly, and wherein the sub-assembly is configured to be securely coupled to the second component to form an assembly.

8. The retention clip of claim 6, wherein the flexible wings of the opposed first and second frames each further comprise a contact tab that extends inwardly from an upper shoulder, wherein a portion of the contact tab is configured to securely abut onto the surface, and wherein the surface is accessed through a hole of the second component.

9. The retention clip of claim 6, wherein the interior flanges on each of the first and second frames further include distal ends that extend below the bottom edges of the bridging members.

10. The retention clip of claim 6, wherein the protrusions of the first frame mirror the protrusions of the second frame.

11. The retention clip of claim 6, wherein the protrusions are spaced apart from the upper bends by a first vertical distance, and the protrusions are spaced apart from the central beam by a second vertical distance that is less than the first vertical distance.

12. A retention clip configured to securely connect a first component to a second component, the retention clip having a generally U-shaped body comprising:
a first frame connected to an opposed second frame at a central beam, wherein an interior of the retention clip is defined between the opposed first and second frames, each of the first and second frames including:
outer lateral legs that fold inwardly at upper bends to form interior flanges that are disposed within the interior and extend in the general direction of the central beam, and wherein protrusions extend inwardly and downwardly from a bridging member that integrally connects the interior flanges, and
wherein the protrusions comprise serriform structures having ramped surfaces that extend in the direction of a central longitudinal plane of the clip.

13. The retention clip of claim 12, wherein the interior flanges include distal ends, and wherein the bridging member is spaced apart from each of the distal ends and the upper bends of the clip.

14. The retention clip of claim 13, wherein the retention clip is configured to securely couple to the first component to form a sub-assembly, and wherein the sub-assembly is configured to be securely coupled to the second component to form an assembly.

15. The retention clip of claim 12, wherein the protrusions extending from the bridging member of the first frame are disposed entirely between the interior flanges of the first frame, and wherein the protrusions of the bridging member of the second frame are disposed entirely between the interior flanges of the second frame.

16. The retention clip of claim 12, wherein the first and second frames further include flexible wings that extend upwardly and outwardly from the central beam, the flexible wings including an upper shoulder and a contact tab that extends inwardly from the upper shoulder in the direction of the central longitudinal plane.

* * * * *